United States Patent
Culkin

(10) Patent No.: US 9,507,017 B2
(45) Date of Patent: Nov. 29, 2016

(54) SIMULTANEOUS MULTI-FREQUENCY SIGNAL PROCESSING METHOD

(71) Applicant: SRC, Inc., North Syracuse, NY (US)

(72) Inventor: Daniel R. Culkin, Cazenovia, NY (US)

(73) Assignee: SRC, INC., North Syracuse, NY (US)

( * ) Notice: Subject to any disclaimer, the term of this patent is extended or adjusted under 35 U.S.C. 154(b) by 819 days.

(21) Appl. No.: 13/833,399

(22) Filed: Mar. 15, 2013

(65) Prior Publication Data

US 2016/0097840 A1   Apr. 7, 2016

(51) Int. Cl.

| G01S 7/28 | (2006.01) |
| --- | --- |
| G01S 7/32 | (2006.01) |
| G01S 13/28 | (2006.01) |
| G01S 13/58 | (2006.01) |
| G01S 13/32 | (2006.01) |
| G01S 7/285 | (2006.01) |
| G01S 13/00 | (2006.01) |

(52) U.S. Cl.
CPC ............... *G01S 13/325* (2013.01); *G01S 7/28* (2013.01); *G01S 7/285* (2013.01); *G01S 7/32* (2013.01); *G01S 13/003* (2013.01); *G01S 13/28* (2013.01); *G01S 13/581* (2013.01)

(58) Field of Classification Search
CPC ............ G01S 7/28; G01S 7/285; G01S 7/32; G01S 13/28–13/288; G01S 13/581
USPC ................. 342/132, 134, 159, 195; 375/240, 375/240.25
See application file for complete search history.

(56) References Cited

U.S. PATENT DOCUMENTS

| 4,161,732 | A | * | 7/1979 | Longuemare, Jr. ... | G01S 13/288 342/201 |
| --- | --- | --- | --- | --- | --- |
| 4,359,735 | A | * | 11/1982 | Lewis ................... | G01S 13/282 342/194 |
| 4,673,941 | A | * | 6/1987 | Van Der Mark ..... | G01S 13/282 342/194 |
| 4,910,520 | A | | 3/1990 | Rosen et al. | |
| 5,128,681 | A | * | 7/1992 | McGroary ............. | G01S 13/30 342/132 |
| 5,414,428 | A | | 5/1995 | Gallagher et al. | |
| 5,479,120 | A | * | 12/1995 | McEwan ............ | G01R 19/0053 327/91 |

(Continued)

FOREIGN PATENT DOCUMENTS

WO    2007082335 A1    7/2007

OTHER PUBLICATIONS

Holliday, Polarization Isolation and Zero Time-Sidelobe Pulse Compression Through Group-Complementary Coding, Jun. 7, 1988, pp. 1-8, USA.

(Continued)

*Primary Examiner* — Peter Bythrow
(74) *Attorney, Agent, or Firm* — Bond Schoeneck & King, PLLC; George McGuire; Jonathan Gray

(57) ABSTRACT

A method for the simultaneous multi-frequency signal processing within a single receiver is presented. The pulse compression or filtering method samples the received signal at a data rate commensurate with the maximum frequency separation of waveforms at separate frequencies being received, but the compression calculations are only performed at a rate commensurate with the bandwidth of each individual transmit waveform set. The method reduces the processor requirements for extracting all available information from these signals.

4 Claims, 2 Drawing Sheets

(56) References Cited

U.S. PATENT DOCUMENTS

Figure 1:
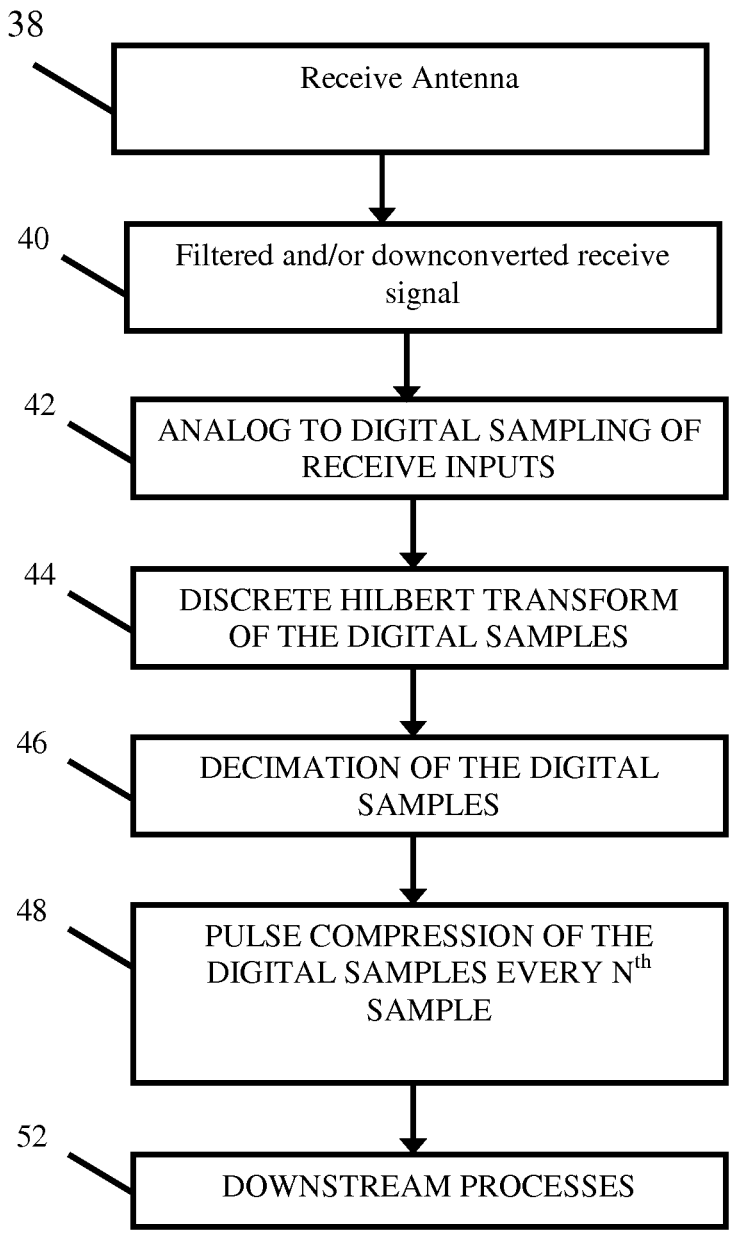

| | | | |
|---|---|---|---|
| 5,604,503 A * | 2/1997 | Fowler | G01S 13/003 342/159 |
| 6,087,981 A * | 7/2000 | Normant | G01S 13/282 342/131 |
| 6,208,285 B1 * | 3/2001 | Burkhardt | G01S 7/2921 342/132 |
| 6,750,809 B1 * | 6/2004 | Cho | G01S 13/90 342/129 |
| 6,781,540 B1 | 8/2004 | MacKey et al. | |
| 6,807,517 B2 | 10/2004 | Chevalier et al. | |
| 6,965,341 B1 * | 11/2005 | Cho | G01S 13/24 342/128 |
| 7,944,390 B2 * | 5/2011 | Krieger | G01S 13/9035 342/118 |
| 7,994,965 B2 * | 8/2011 | Longstaff | G01S 13/003 342/153 |
| 8,106,813 B2 * | 1/2012 | Pillai | G01S 7/282 342/159 |
| 8,149,894 B2 * | 4/2012 | Fudge | H04B 1/7136 375/133 |
| 8,811,535 B2 * | 8/2014 | Brodzik | G01S 13/003 365/151 |
| 2005/0179585 A1 * | 8/2005 | Walker | G01S 13/0209 342/134 |
| 2006/0140291 A1 * | 6/2006 | Thomas | H04L 27/265 375/260 |
| 2007/0285302 A1 * | 12/2007 | Aarseth | G01S 13/282 342/25 R |
| 2007/0285315 A1 | 12/2007 | Davis et al. | |
| 2008/0143587 A1 | 6/2008 | Johnson | |
| 2010/0164784 A1 * | 7/2010 | Longstaff | G01S 13/003 342/202 |
| 2012/0235858 A1 * | 9/2012 | Dougherty | G01S 7/4026 342/169 |
| 2012/0256780 A1 * | 10/2012 | Shoji | G01S 13/18 342/101 |

OTHER PUBLICATIONS

Bo Liu, Zishu HE, Qian HE, Institute of Electronic Engineering, University of Electronic Science and Technology of China, Optimization of Orthogonal Discrete Frequency-Coding Waveform Based on Modified Genetic Algorithm for MIMO Radar, pp. 966-970, Chengdu, China.

Vito F. Mecca et al., Department of Electrical and Computer Engineering, Duke University, MIMO Radar Space-Time Adaptive Processing for Multipath Clutter Mitigation, pp. 249-253, Durham, NC, 2006 IEEE.

Blunt et al., EECS Dept./TTTC Radar Systems Lab University of Kansas, Hybrid Adaptive Receive Processing for Multistatic Radar, 2007 IEEE, pp. 5-8.

Gerlach et al., Combined Multistatic Adpaptive Pulse Compression and Adaptive Beamforming for Shared-Spectrum Radar, IEEE Journal of Selected Topics i Signal Processing, vol. 1, No. 1, Jun. 2007, pp. 137-146.

* cited by examiner

SIMULTANEOUS MULTI-FREQUENCY SIGNAL PROCESSING METHOD

BACKGROUND OF THE INVENTION

1. Field of Invention

The present invention relates to a method for signal processing, and, more particularly, to a method for the processing of multiple signals of different frequencies which provides a reduction in processing required for the extraction of information from those signals.

2. Description of Prior Art

The digital sampling of signals is well understood throughout industry and academia. The analog to digital sampling rate is typically performed at or above the Nyquist frequency, which refers to the minimum rate at which a signal must be measured in order to extract all available information from the given signal. In general, the Nyquist frequency is a frequency that is equivalent to the frequency of the maximum bandwidth of the signal under analysis. In the case that multiple signals are being simultaneously measured, the Nyquist frequency is equivalent to the difference between the highest and lowest absolute frequency of the signals under analysis. Examples of applications for which the simultaneous processing of multiple frequencies may be utilized include radar (particularly MIMO, and/or multistatic), communications, electronic warfare, and general purpose receivers for arbitrary functions.

Multiple-input multiple-output ("MIMO") uses multiple transmitting and receiving antennas to improve the capabilities of a variety of systems including communications and radar. With multiple transmitting antennas, a MIMO system is capable of simultaneously sending more than one data stream or signal. Similarly, the receiver antennas of a MIMO system can receive multiple data streams or signals. The ability to receive multiple signals allows a MIMO system to surmount problems associated with multipath effects in which transmitted information is scattered by obstacles and reaches the receiving antennas at different times with different angles.

MIMO systems often utilize multiple transmit waveforms in which the waveforms of the many multiplexed signals transmitted simultaneously by the transmit antennas are varied to make them separable. In other words, each transmit antenna transmits a waveform that is separable from the signals transmitted by the other transmit antennas. Thus, while each receive antenna will simultaneously receive all the transmitted waveforms, each individual waveform must be separable from the other signals. Individual waveforms can be made separable through phase/amplitude coding, amplitude (time), frequency, or other methods.

Frequency orthogonal MIMO systems utilize frequency multiplexing in which a diverse frequency is transmitted by each transmit antenna. Upon receive, the processing of multiple waveforms of different frequency typically require a very large amount of processing power to separate when received, due to the Nyquist frequency sampling required and the subsequent processing to separate the frequencies. As such, there is still a need for a mechanism that further reduces the processing power required by a frequency-orthogonal MIMO system.

Similarly, multi-static radar systems rely on energy transmitted from one or more sources cooperatively or non-cooperatively. These signals are often different frequencies to enable separability.

Similarly, receivers for the purpose of electronic intelligence or electronic warfare are typically required to receive a broad range of signals that are separated in frequency.

Similarly, receivers for general purposes will typically be required to receive a broad range of signals at different frequencies.

BRIEF SUMMARY OF THE INVENTION

It is therefore an object and advantage of the present invention to provide a method for multi-frequency signal processing.

It is a further object and advantage of the present invention to provide a method to reduce the processor requirements for receivers capable of simultaneously receiving and digitally processing multiple frequencies simultaneously.

It is yet another object and advantage of the present invention to provide a system with reduced processing size requirements and similarly reduced weight and power requirements.

Other objects and advantages of the present invention will in part be obvious, and in part appear hereinafter.

In accordance with the foregoing objects and advantages, the present invention provides method for a digitally processed receiver that requires a significantly lower processor size than current art. This reduced processor size is achieved by using a special pulse compression or signal filtering technique that samples the received signal at a data rate commensurate with the maximum frequency separation of the separate transmit waveforms, but the pulse compression or filtering calculation is only performed at a rate commensurate with the bandwidth of each individual transmit waveform set. This allows a reduction of the required pulse compression calculations while still allowing for the separation of the return from each individual transmit waveform.

BRIEF DESCRIPTION OF THE SEVERAL VIEWS OF THE DRAWING(S)

Figure 2:
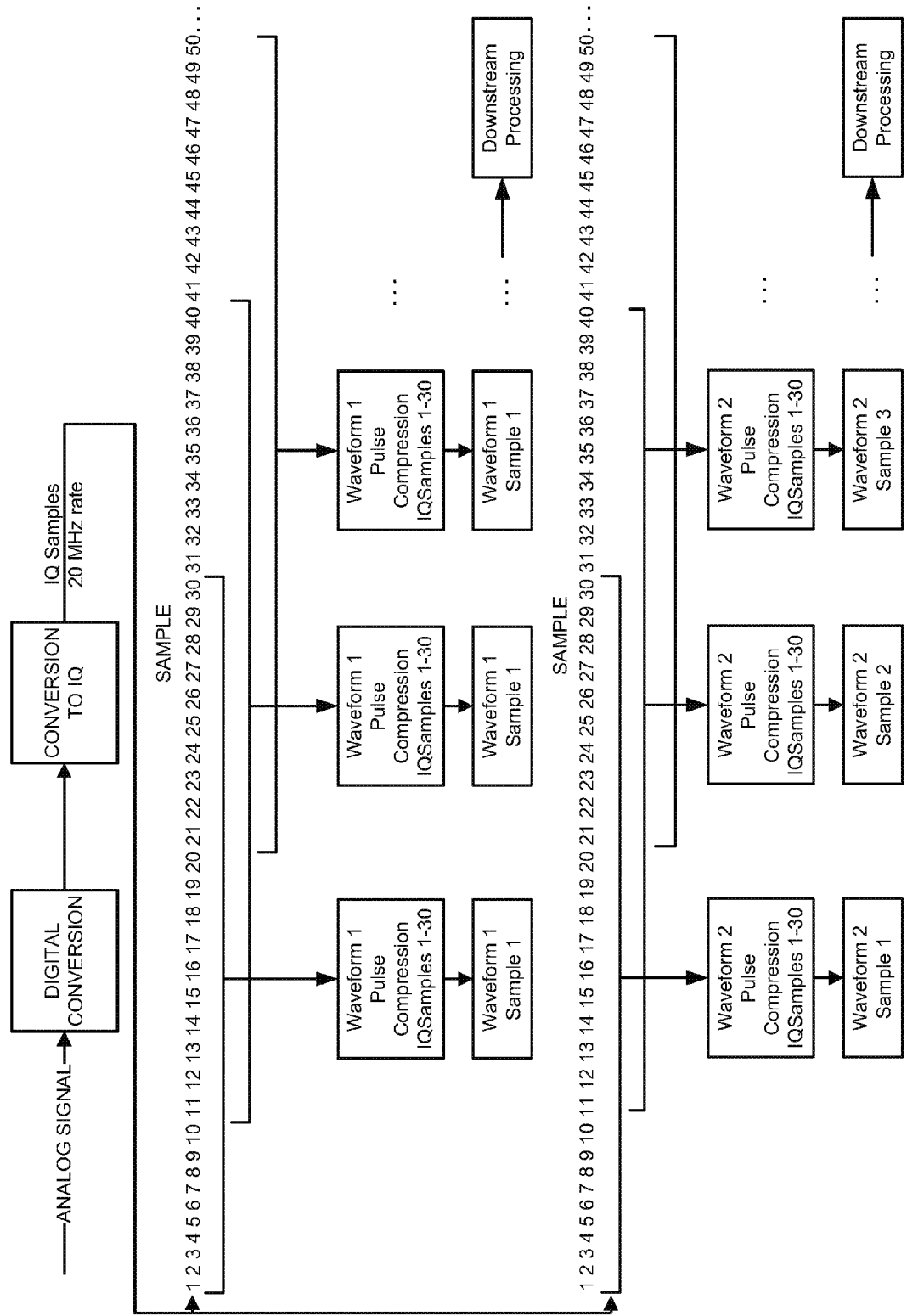

The present invention will be more fully understood and appreciated by reading the following Detailed Description of the Invention in conjunction with the accompanying drawings, in which:

FIG. 1 is a schematic/flow chart/block diagram of the method and calculations for the multi-frequency signal processing according to one embodiment of the present invention; and FIG. 2 is a block diagram according to an embodiment of the present invention.

DETAILED DESCRIPTION

Referring now to the drawings wherein like reference numerals designate identical or corresponding parts throughout the several views, there is shown in FIG. 1 a schematic representation of a method for multi-frequency signal processing. Receive antenna 38 receives an incoming electromagnetic ("EM") signal in the environment, which may or may not be analog processed via filtering or down-conversion 40, processes that are well understood. In another embodiment of the present invention, the method is used to process a signal from a source other than directly from the antenna. The signal is directed to the analog-to-digital (A/D) converter 42. The A/D converter 42 samples the analog EM signal at pre-programmed time intervals and digitizes it. The digital information can be processed immediately or stored in a memory buffer for subsequent analysis.

The parameters of the sampling can be determined through design of the antenna circuitry, through user programming, or through any other mechanism known to those skilled in the art.

The digitized signal is then processed by a process which converts the signal input into shifted in-phase ("I") and quadrature ("Q") signals, such as a discrete Hilbert transform filter ("DHT") 44. If necessary, the output of DHT filter 44 is then processed by a first decimator 46 which uses aliasing and downsampling to effectively analyze only every $n^{th}$ sample of the signal, where the resultant sampling rate is commensurate with the maximum frequency separation of the signals to be processed.

Next, the filtered IQ signals are directed to pulse compressor 48. The pulse compression is performed using samples at a data rate commensurate with the maximum frequency separation of the signals to be processed. However, the pulse compression calculation is only performed at a rate commensurate with the bandwidth of each individual transmit waveform set. The pulse compressed samples are then processed downstream 52 by methods well understood by those skilled in the art.

One embodiment of the pulse compression with decimation can be described as a modified Time Delay Correlator ("TDC") implementation. In a standard TDC, complex coefficients are utilized to filter a signal of interest from a stream of measured complex data samples. The coefficients are multiplied in order with contiguous measured samples, and the summed results correspond to a response value. The measured samples are then stepped one point in time, and the process repeated. The sampling rate (and corresponding coefficients) correspond to time samples, corresponding to a sampling rate that is sufficient to extract the desired bandwidth of signal from the measured samples.

In the method disclosed here, measured data streams are sampled at a rate commensurate with the Nyquist frequency as applied to the minimum and maximum frequencies associated with the multiple signals that are being measured simultaneously. Within the measured signals of interest are multiple combined signals each of which consists of a waveform with a bandwidth less than the total sampling rate. For most applications, it is of interest to separate these signals and perform mathematical processes on them individually.

In order to reduce the data rate of each of these signals, they need to be extracted from the measured samples. To capture all of the signals, the measured samples must be filtered or pulse compressed using a sample rate commensurate with the total frequency separation of all of the signals; however, the resulting response of the pulse compressed output can be completely described at a sample rate corresponding to the bandwidth of the individual signals. In the method disclosed here, a separate pulse compression is performed for each signal of interest utilizing all of the samples at the high data rate; however, the pulse compression calculation is only performed at the data rate necessary for the individual signal bandwidth. Instead of the measured samples moving one contiguous sampling rate, samples are skipped. In doing so, the total pulse compression calculations required is reduced, and the output samples are decimated to only the necessary data rate reducing processing load for the remainder of the radar processor.

Following pulse compression, each individual pulse-compressed response can be processed by any method known to those skilled in the art of the application the invention is implemented in.

EXAMPLE 1

This Example describes the examination of a set of parameters according to one embodiment of the present invention. Consider a case for which a multi-static radar is required to receive four frequency modulated waveforms of 1.5 microseconds in duration, of 2 MHz bandwidth, with the lowest and highest frequency signal separated by 18 MHz in center frequency (resulting in a peak frequency separation of 20 MHz). The individual waveforms are made separable in the pulse compression, which is executed using a data sampling rate of 20 MHz, and of a width of 30 samples at 20 MHz (corresponding to the pulsewidth). However, each individual transmit bandwidth is 2 MHz, allowing for the correlation to be calculated at every $10^{th}$ data point. This reduces the total data rate by a factor of 5, but allows for the separation of the return from each individual waveform.

Although the present invention has been described in connection with a preferred embodiment, it should be understood that modifications, alterations, and additions can be made to the invention without departing from the scope of the invention as defined by the claims.

What is claimed is:

1. A method for processing multiple signals of interest in a single receiver, for which the signals are of different frequencies, the method comprising the steps of:
   a) receiving an analog signal Z comprising a combination of at least two waveforms, each having an arbitrary transmit bandwidth X and having an arbitrary center frequency separation Y;
   b) digitally sampling said analog signal at a rate at least equal to the frequency Y+X, resulting in a plurality of samples; and
   c) digitally pulse compressing, for each waveform, the samples using sample rates at least equal to the frequency Y+X, wherein digitally pulse compressing comprises performing a plurality of correlation calculations, the plurality of correlation calculations comprising at least a first correlation calculation and a second correlation calculation, wherein the first correlation calculation and the second correlation calculation each begin at a sample of the plurality of the samples, wherein the second correlation calculation begins at a sample non-contiguous with the sample at which the first correlation calculation begins.

2. The method of claim 1, further comprising the step of filtering the sampled signal by Hilbert transform.

3. The method of claim 2, wherein said Hilbert transform is a discrete Hilbert transform.

4. The method of claim 1, in the case where the digital sampling of the signal Z is greater than Y+X, further comprising the step of decimating the sampled signal.

* * * * *